United States Patent Office

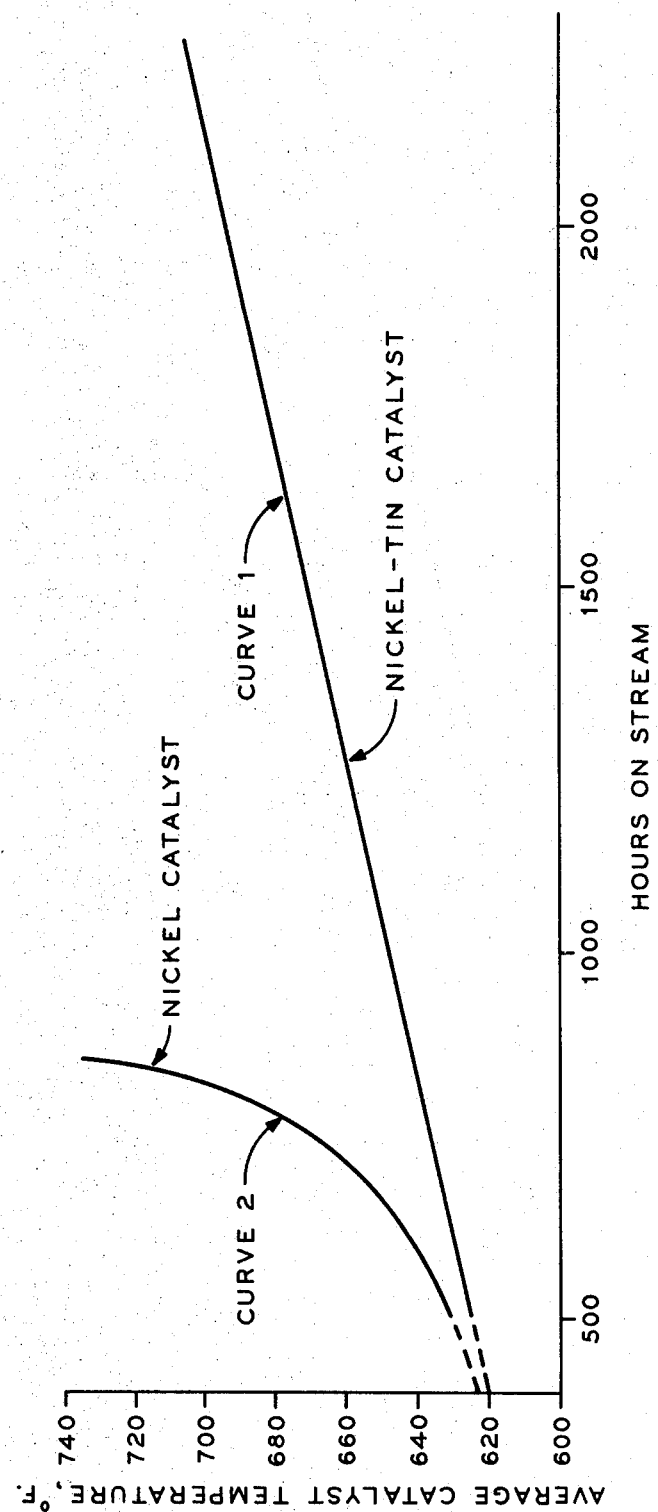

3,542,696
Patented Nov. 24, 1970

3,542,696
HYDROCRACKING CATALYST
Bernard F. Mulaskey, Pinole, Calif., assignor to Chevron Research Company, San Francisco, Calif., a corporation of Delaware
Continuation-in-part of application Ser. No. 742,321, July 3, 1968, which is a continuation-in-part of application Ser. No. 645,855, June 8, 1967, which in turn is a continuation-in-part of application Ser. No. 568,536, July 28, 1966. This application Oct. 14, 1968, Ser. No. 767,239
Int. Cl. B01j 11/74, 11/78
U.S. Cl. 252—439          10 Claims

ABSTRACT OF THE DISCLOSURE

A novel catalyst composition comprising nickel, or compounds thereof, associated with a coprecipitated composite of tin, or compounds thereof, and a siliceous oxide.

CROSS-REFERENCE

This application is a continuation-in-part of application Ser. No. 742,321, filed July 3, 1968, which in turn is a continuation-in-part of application Ser. No. 645,855, filed June 8, 1967, now Pat. No. 3,399,132 which in turn is a continuation-in-part of application Ser. No. 568,536, filed July 28, 1966, now abandoned.

BACKGROUND OF THE INVENTION

Field

The present invention relates to a new composition of matter useful for hydrocracking operations. Still more particularly, the present invention is concerned with a novel catalytic composition comprising nickel, or compounds thereof, in association with a coprecipitated composite of tin, or compounds thereof, and a siliceous oxide.

Prior art

Hydrocarbon hydroconversion processes, such as hydrocracking, hydrogenation, hydrofining, and isomerization, are of special importance in the petroleum industry as a means of improving the quality and usefulness of hydrocarbons. The requirement for a diversity of hydrocarbon products, including, for example, high quality gasoline, has led to the development of many catalysts and procedures for converting hydrocarbons in the presence of hydrogen. A particularly important hydrocarbon hydroconversion process is hydrocracking. Although the usefulness of the catalyst of the present invention will be discussed only in terms of hydrocracking operations, it is to be understood that the catalyst can be used in other hydroconversion processes as well.

Catalytic hydrocracking of hydrocarbons is a well-known process in the petroleum industry for converting mixtures of hydrocarbons to lower boiling products in the presence of hydrogen and a catalyst at elevated temperatures and pressures. Two prominent reactions occurring during hydrocracking are cracking and hydogenation. In general, reaction conditions and catalyst compositions can be varied to manipulate the extent of either reaction. Hydrocracking operations are generally characterized by employing catalysts comprising porous supports, particularly porous inorganic oxide supports, having associated therewith a hydrogenating metal component. Metals which have been suggested in the patent literature as hydrogenating components for hydrocracking catalysts, include, by way of example, the Groups I, II, IV, VI and VIII metals of the Periodic Table, for example, zinc, mercury, titanium, tin, lead, chromium, molybdenum, tungsten, copper, silver, gold, iron, cobalt, nickel, and the noble metals. Catalysts comprising many of the above metals have been found to possess insufficient hydrogenating and/or cracking activity to be practical for hydrocracking processes. Typical hydrogenating metal components which have found extensive use for hydrocracking are the Group VIII metals, and compounds thereof. In particular, the use of nickel and/or nickel sulfide, disposed on porous inorganic oxide supports, for example, silica-containing supports, as catalysts has been a major development in catalytic hydrocracking. However, means of improving nickel-containing catalysts are continually being sought, and as a consequence many patents have issued in this area.

SUMMARY OF THE INVENTION

In accordance with the present invention, a new catalytic composition of matter has been discovered. The new catalytic composition comprises nickel, or compounds thereof, in association with a coprecipitated composite of tin, or compounds thereof, and a siliceous oxide. The nickel and tin, or their compounds, are present in an amount of 2–50 combined weight percent metals, with a nickel to tin weight ratio of 0.25–20.

As a specific embodiment of the present invention, the novel catalytic composition of matter comprises a coprecipitated composite of nickel and tin, or their compounds, and a siliceous oxide. The coprecipitated composite is preferably prepared by the coprecipitation or cogelation of a mixture of compounds of the hydrogenating metals, that is, compounds of nickel and tin, and a compound of silicon.

As a further specific embodiment of the present invention, a novel catalytic composition of matter has been discovered comprising a crystalline zeolitic aluminosilicate thoroughly admixed with a composite comprising nickel, or compounds thereof, and a coprecipitate of tin, or compounds thereof, and a siliceous oxide. The combined weight percent of nickel and tin is from 2–50, based on the finished catalyst, with the nickel to tin weight ratio of from 0.25-20. The crystalline zeolitic aluminosilicate preferably has uniform pore dimensions of greater than 6 angstroms.

BRIEF DESCRIPTION OF THE DRAWINGS

The present invention will be better understood and will be further explained hereafter with reference to the figure, which shows for comparison purposes the average catalyst temperature required to maintain 80 percent conversion of the feed in a hydrocracking process to lower boiling products as a function of hours on stream using a catalyst comprising a coprecipitated composite of nickel and silica-alumina (curve 2) and using a catalyst of the present invention comprising a coprecipitated composite of nickel, tin and silica-alumina (curve 1). The fouling rate can be obtained from the increase in temperature necessary to maintain the desired conversion level. The superiority of the catalyst of the present invention for hydrocracking may be seen in the significantly lower fouling rate.

DESCRIPTION OF THE INVENTION

The catalyst of the present invention is prepared by coprecipitating or cogelling a mixture of a compound of tin and a compound of silicon. If desired, a compound of nickel may be present in the mixture prior to coprecipitation or cogelation. Also, other compounds of metals and/or nonmetals, whose oxides form an inorganic oxide carrier, can be present in the mixture to be coprecipitated. Thus, for example, a compound of the metals and/or nonmetals of Groups II through VI of the Periodic Table can be present. Hence, in the finished coprecipitated composite, in addition to tin, or compounds of tin, and silica being present, there may also be alumina, magnesia, titania, zirconia and combinations thereof. Thus the coprecipitated composite can comprise tin, or compounds of tin, and a siliceous oxide including, by way of example, silica-alumina, silica-magnesia, silica-zirconia, silica-magnesia-titania, and silica-alumina-zirconia. Silica-alumina is particularly preferred. The siliceous oxide should comprise at least about 30 weight percent silica, preferably 30 to 99 weight percent silica.

The coprecipitated composite should preferably have a high surface area, that is, a surface area greater than 50 m.$^2$/gm. and preferably greater than 150 m.$^2$/gm. Generally, the coprecipitated composite should have a surface area of from 50–700 m.$^2$/gm.

Crystalline zeolitic aluminosilicates may be thoroughly admixed with the coprecipitated composite of tin or compounds thereof and the siliceous oxide. Both the natural and synthetic crystalline zeolitic aluminosilicates can be used. Crystalline zeolitic aluminosilicates, often referred to as zeolites, comprise alumino-silicate cage structures in which alumina and silica tetrahedra are intimately connected with each other in an open three-dimensional network. The tetrahedra are cross-linked by the sharing of oxygen atoms. In general, the spaces between the tetrahedra are occupied by water molecules prior to dehydration. Dehydration results in crystals interlaced with channels or pores of molecular dimensions, which channels or pores selectively limit the size and shape of foreign substances that can be adsorbed. Thus, the crystalline zeolitic aluminosilicates are often referred to as molecular sieves. In general, the crystalline zeolitic aluminosilicates have exchangeable zeolitic cations associated with the silica-alumina tetrahedra which balance the negative electrovalence of the tetrahedra. The cations may be any number of ions such as, for example, the alkali metal ions, the alkaline earth ions, and the rare earth ions. The cations may be mono-, di-, and trivalent. In general the preferred forms are those wherein the exchangeable zeolitic cations are divalent metals, and/or hydrogen. Normally the zeolites are prepared first in the sodium or potassium form, after which the monovalent cations are ion-exchanged out with desired divalent metal cations, such as calcium, magnesium or manganese cations, or where the hydrogen form is desired, with ammonium cations followed by heating to decompose the ammonium cations to leave hydrogen ions. The hydrogen form is often referred to as decationized.

The crystalline zeolitic aluminosilicates possess relatively well-defined pore structures. For purposes of the present invention, it is preferred that the pore structure of the crystalline zeolitic aluminosilicates comprise openings characterized by pore diameters greater than 6 A. and particularly uniform pore diameters of approximately 6–15 A. The uniform pore structure wherein the pores are greater than 6 A. permit hydrocarbons access to the catalyst. Generally, zeolites which find use for purposes of the present invention have silica/alumina ratios in the crystalline form greater than about 2. Examples of appropriate crystalline zeolitic alumino-silicates are the natural faujasites, synthesized zeolite X disclosed in U.S. Patent 2,882,244, zeolite Y disclosed in U.S. Patent 3,130,007, zeolite L disclosed in U.S. Patent 3,216,789, and decationized zeolite Y described in U.S. Patent 3,130,006.

As indicated above, the catalytic composition of the present invention must also have nickel or compounds thereof in association with the coprecipitated composite of tin, or compounds thereof, and the siliceous oxide. The nickel may be present as part of the coprecipitated composite or may be present by impregnation, ion exchange, etc. It is particularly preferred that the nickel be present as part of the coprecipitate.

It has been observed that, in general, nickel-tin supported catalysts comprising a coprecipitated composite of tin and the porous siliceous oxide, with the nickel present either by coprecipitation or by impregnation, etc., are remarkably superior for hydrocracking reactions to nickel-tin supported catalysts, where, if there is a coprecipitated composite, tin is not part of the coprecipitate. While not intending to limit the scope of the present invention or be bound by any theoretical explanation, it appears that the presence of tin in the coprecipitated composite facilitates the formation of an alloy with the nickel during subsequent high temperature treatment, and that this alloy is at least in part responsible for the superior hydrocracking activity. The alloy is believed to be Ni$_3$Sn. Apparently the alloy forms more readily when both nickel and tin are part of the coprecipitated composite, for catalysts comprising coprecipitated composites of nickel and tin and the porous siliceous oxide are more active for hydrocracking than catalysts comprising nickel impregnated onto a coprecipitated composite of tin and the porous siliceous oxide.

The catalytic composition of the present invention comprises nickel and tin, or compounds thereof, preferably present in an amount from 2 to 50 combined weight percent metals. That is, regardless of the form in which nickel and tin exist in the catalyst, whether as metallic nickel and tin, or as compounds, such as the oxides or sulfides, the total combined weight percent of nickel and tin in the catalyst, calculated as the metals, should be from 2 to 50. A catalyst containing less than 2 weight percent hydrogenating metals content is too low in hydrogenating activity to be useful, for example, in hydrocracking of hydrocarbons; rather, hydrocracking with such a catalyst results in the production of excessive coke which results in rapid deactivation of the catalyst. Catalyst compositions comprising total hydrogenating metal contents in excess of 50 weight percent can be prepared and employed in hydrocarbon hydroconversion processes. Generally, however, it is not advantageous to exceed 50 weight percent hydrogenating metal content in a catalyst because of the high cost of the hydrogenating metal components and also because high hydrogenating metal content severely limits the amount of the porous siliceous oxide. Preferably, catalysts of the present invention comprise nickel and tin, or compounds thereof, in an amount from 5 to 30 combined weight percent and still more preferably from 7 to 25.

The nickel and tin, or compounds thereof, should be present in the catalyst in a weight ratio of nickel to tin of from 0.25 to 20, determined as the metals. Preferably, the nickel to tin weight ratio is from 0.5 to 20 and most preferably 0.5 to 10. In general, when employing high combined weights of nickel and tin, it is preferred to use high nickel to tin weight ratios.

The hydrogenating metals, that is, nickel and tin, can be in the metallic form, or in compound form, such as, for example, the oxide or sulfide form. The sulfide form of the metals is the preferred compound form for purposes of the present invention. However, any compounds of the metals which perform as hydrogenating components can be used in the catalyst.

A preferred method of preparation of the novel catalytic composition of the present invention is by simultaneous coprecipitation or cogelation of a mixture of nickel and tin compounds, and compounds of the metals and/or nonmetals whose oxides form the siliceous oxide-containing, inorganic oxide carrier. The method of preparation of a coprecipitated composite of only tin and the siliceous oxide is, in general, the same as that for a coprecipitated composite of both metals and the siliceous oxide. For the sake of brevity, the preparation of a coprecipitated composite will be described only in terms of using both hydrogenating metals in the coprecipitated composite. In general, preparation of the coprecipitated composite can be accomplished by forming a solution and/or a sol of the compounds, subsequently precipitating the mixture, preferably at a pH from about 5.5 to 8, by the addition of a precipitating agent, as for example a base, and then washing the coprecipitated composite to remove extraneous materials. Finally, the coprecipitated composite can be dried and then calcined at an elevated temperature. Thus, for example, a coprecipitated composite comprising nickel and tin intimately associated with silica-alumina can be prepared by forming an aqueous solution of aluminum chloride, sodium silicate, nickel chloride and stannous chloride. The solution can then be coprecipitated by the addition of ammonium hydroxide; thereafter the coprecipitated composite can be washed, dried and calcined.

In order to prepare a coprecipitated composite comprising the porous siliceous oxide and nickel and tin components, it is desirable that the starting components be such that when admixed together the resulting mixture will form a solution and/or sol so as to obtain uniform dispersion throughout the mixture.

The compounds in the initial mixture can advantageously be salts such as the nitrates, citrates, formates, alcoxides, and sulfates. Preferably chlorides and acetates are employed. In view of the process advantages of using chloride salts due to their readiness to form solutions with other compounds, their commercial availability and relatively low price, it is often desirable to employ them. The anion content, e.g., chloride, in the final coprecipitate is preferably reduced to below about 0.25 percent of the total weight of the final coprecipitate. Washing with water can often effectively lower the anion content to the desirable limit. If anions are present in the coprecipitate which are difficult to remove by washing, such anions can be ion-exchanged with anions more easily removed by washing. Preferred anions for use in ion-exchange are the bicarbonates, carbonates, acetates, and formates.

It may be desirable to employ silica sols in the preparation of the mixture to be precipitated. In such a case, the silica sol can be made by any conventional procedure. Thus, silica sols can be made by hydrolizing tetraethyl orthosilicate with an aqueous HCl solution. Likewise, silica sols can be prepared by contacting silicon tetrachloride with a cold methanol and water solution or with 95 percent ethyl alcohol, or with cold water or ice. Also silica sols can be made by contacting sodium silicate with an ion-exchange resin to remove the sodium, or by contact with an acid at a pH of about 2.5 or less.

After formation of the initial mixture, it is coprecipitated by conventional techniques. Precipitation is preferably conducted at a pH between about 5.5 and about 8. Thus, the initial mixture, if acidic, can be precipitated by the addition of a base. If the mixture is basic, it can be precipitated with an acid. The precipitation can be stepwise, as by a form of titration, or simultaneous, as by mixing of acidic or basic solutions as the case may be in the proper ratios. It is preferable that the precipitating agent should not introduce any components in the mixture that are deleterious.

Following precipitation of the mixture of compounds, the excess liquid is usually removed by filtration. Thereafter the precipitate is washed and ion-exchanged to remove impurities. Washing is generally conducted in more than one step, using water or dilute aqueous solutions of ammonium salts, e.g., ammonium acetate. The coprecipitated composite is then dried in air or inert gases at a temperature less than 400° F., preferably from about 150°–300° F. The coprecipitate is then calcined, generally at a temperature of from about 750° to 1400° F. in the presence of an oxygen-containing gas.

As mentioned previously, the catalyst can comprise a crystalline zeolite aluminosilicate thoroughly admixed with the coprecipitated composite of a siliceous oxide and tin, or compounds thereof. The hydrogenating metal, nickel, can be associated with the crystalline zeolite aluminosilicate or with the coprecipitated composite of tin and the siliceous oxide or with both. The crystalline zeolite aluminosilicate can be admixed with the coprecipitate simply by physical mixing of the two compounds either in the dry state or in the presence of water. In general, it is preferred that the crystalline zeolitic aluminosilicate be intimately dispersed throughout the coprecipitated composite of tin and siliceous oxide. Thus the crystalline zeolitic aluminosilicate is preferably associated with the amphorous coprecipitate by addition of the crystalline zeolitic aluminosilicate to a mixture, for example, solution and/or sol, of tin compounds, and compounds of silicon, prior to or during precipitation of the mixture. It is important that the mixture not be of sufficient acidity to destroy the crystallinity of the zeolite. The zeolite preferably should be present in the final catalytic composition in an amount from 5–80 weight percent and more preferably in an amount from 5–50 weight percent and most preferably in an amount from 10–35 weight percent.

The catalyst of the present invention can be promoted for hydrocracking activity by the addition of halides. Preferably fluoride is employed. The total halide content, for example, fluoride, is preferably associated with the catalyst in an amount from 0.1 to 5 weight percent. In general, the fluoride is combined with the catalyst by contacting suitable compounds such as ammonium fluoride or hydrogen fluoride, either in a water-soluble or in gaseous form, with the catalyst. Preferably the fluoride is incorporated onto the catalyst from an aqueous solution containing the fluoride. In the preparation of a coprecipitated composite, the fluoride can be added during the precipitation.

The catalyst of the present invention can exist with the metals, nickel and tin, in the sulfided form. Even though both metals may be present as part of the coprecipitate, they can nevertheless be sulfided. The sulfiding can be accomplished by contacting the catalyst with a sulfur-affording gas, for example, hydrogen sulfide, under conditions to resut in sulfiding of the hydrogenating metals, that is, nickel and tin. Other sulfur-affording gases include mixtures of hydrogen and $H_2S$ and mixtures of hydrogen with organic sulfur compounds reducible to $H_2S$ at the sulfiding conditions employed. Generally, the catalyst temperature during sulfiding is controlled below 850° F. and preferably below 750° F. Good results can be obtained by contacting the catalyst with a mixture of hydrogen and vaporized organic compounds of dimethyl-disulfide, isopropyl mercaptan, or carbon disulfide at temperatures in the range of 450° to 650° F. It is encompassed as part of the present invention that the catalyst comprising nickel and tin, or compounds thereof, may be contacted with a stream of hydrogen prior to sulfiding.

The form in which the catalyst is used will depend on the type of process involved in the hydroconversion operation, that is, whether the process involves a fixed bed, moving bed, or a fluid operation. Generally, the catalyst will exist in the form of beads, tablets, pellets, spheriodal particles or extruded particles for use in fixed bed or moving bed operations; whereas in a fluidized bed operation, the catalyst will generally exist in a finely-divided or powder form. The catalytic composition can be mixed with a support or binder, if desired, to provide beneficial properties such as increased compactness or attrition resistance. The particular chemical composition of the support or binder is not critical. It is, however, necessary that the support or binder employed be thermally stable under the conditions at which the hydrocarbon hydroconversion process is carried out.

The novel catalystic composition of the present invention may find utility for various hydrocarbon hydroconversion reactions including hydrofining, hydrogenation, reforming, dealkylation, isomerization and hydrocracking. In particular, the catalytic composition of the present invention is most advantageously used for hydrocracking. Hydrocracking with the novel catalyst results in the production of high quality jet fuel. The hydrocarbon feeds employed and the reaction conditions will depend on the particular hydrocarbon hydroconversion process involved and are generaly well known in the petroleum art. Thus, for example, typical feedstocks which can be used for purposes of the present invention include feeds boiling from below about 300° to 1100° F. or higher. Particular feedstocks which may be used include heavy virgin crudes, vacuum distillation residues, catalytic cycle oils, gas oils resulting from the visbreaking of heavy oils, solvent deasphalted oils, and hydrocarbon distillates. These hydrocarbon fractions can be derived from petroleum crude oils, gilsonite, shale oils, tar sand oils, coal hydrogenation and carbonization products and the like.

The conditions of temperature and pressure, hydrogen flow rate and liquid hourly space velocity in the reactor can be correlated and adjusted depending on the particular feedstock utilized, the particular hydrocarbon hydroconversion process, and the products desired. For example, hydrofining operations are generally conducted at a temperature from 500° to 850° F., a pressure within the range 400 to 4000 p.s.i.g., a liquid hourly space velocity (LHSV), i.e., the flow of hydrocarbon feed relative to the catalyst, of from 0.2 to 10, and a hydrogen flow rate of above about 500 s.c.f./bbl. of feed.

In general, hydrocracking is accomplished at a temperature from about 450° to 900° F. and a pressure between about 500 to 10,000 p.s.i.g. The higher temperatures and pressures are used with the higher boiling feedstocks. Preferably pressures between 1200 and 6000 p.s.i.g. are used. The hydrogen flow rate into the reactor is maintained between 1,000 to 20,000 s.c.f./bbl. of feed and preferably in the range 4,000 to 10,000 s.c.f./bbl. The hydrogen consumption will vary depending on the properties of the feed and the other hydrocracking conditions used, but there is generally consumed in the hydrocracking zone at least 500 s.c.f./bbl. of hydrogen per barrel of feed. In general, the hydrogen consumption will range from 500 to 5,000 s.c.f./bbl. The excess hydrogen not consumed in the reaction is separated from the treated feed and preferably purified and recycled. The liquid hourly space velocity (LHSV) will generally be in the range from 0.1 to 10 and preferably, 0.3 to 5.

Reference will be made to catalyst activity which refers to the ability of a catalyst to promote hydrocracking reactions. The activity of any particular catalyst can best be shown by a standard test from which the "activity index" of the catalyst can be determined. A definition and description of "activity index" is found in U.S. Patent 3,243,368. The activity index can be used to effectively compare various catalysts. However, it must be emphasized that the differences in activity indices between catalysts are highly significant and not linear in function. Thus, for example, a two-fold increase in the activity index might actually result in a threefold increase in conversion to lower boiling products. Hence, what may appear to be a nominal increase in the activity index can be, in fact, one of considerable importance, the difference being not merely one of degree but of kind.

In testing a catalyst to determine its activity index, a hydrocarbon feedstock, along with 12,000 s.c.f. hydrogen per barrel of feed, is passed in contact with the catalyst in a reactor at a liquid hourly space velocity of 2 and at a reactor temperature of 570° F. The reactor temperature is then reduced to 540° F. and the feed passed through for another period of time at the same rate. Samples of the product are collected at about 2 hour intervals during the latter period of time. These samples are allowed to flash off light hydrocarbons at ambient temperature and pressure, following which a determination is made of the API gravity of each sample. The aniline point of the samples may aso be determined when it is desired to obtain an indication of the relative tendency of the particular catalyst to hydrogenate aromatic present in the feed. The individual API gravity values are then plotted and a smooth curve is drawn from which an average value can be obtained. Samples collected at the end of the eighth hour of operation at the 540° F. temperature are usually regarded as representative of steady state operating conditions and may be distilled to determine conversion to products boiling below the initial boiling point of the feed. This conversion under steady state test conditions is a true measure of the activity of the catalyst. The difference between the API gravity of the product samples and the API gravity of the feed is a rapid and convenient method of characterizing the catalyst which correlates smoothly with conversion. For convenience, the foregoing change in API gravity of the product from that of the feed is referred to as the activity index of the catalyst.

In measuring the activity indices of particular catalysts for purposes of the present invention a straight-run feedstock, identified as Feed 1 in Table I was passed in contact with the catalyst at 570° F. for 34 hours, whereupon the reactor temperature was lowered to 540° F. and the feed passed through for another 34 hours. Thereafter, the feedstock was changed to a light catalytic cycle oil identified either as Feed 2 or Feed 3 in Table I and passed in contact with the catalyst at 540° F. for 30 hours. During this later 30 hours, the API gravity of the product was measured every 2 hours, and the activity index determined. In a few instances, the straight-run feedstock (Feed 1) was passed in contact with the catalyst for the latter 30 hours and the API gravity of the product used to determine the activity index.

TABLE I

| | Feed | | |
|---|---|---|---|
| | 1 | 2 | 3 |
| Gravity, ° API | 31.5 | 28.5 | 29.3 |
| Aniline point, ° F | 172.6 | 111.6 | 119.4 |
| Nitrogen, p.p.m | 0.44 | 0.55 | 0.14 |
| Aromatics, vol. percent | 10.8 | 35.1 | 29.4 |
| Naphthenes, vol. percent | 72.2 | 51.6 | 59.6 |
| Paraffins, vol. percent | 17.1 | 13.4 | 11.0 |
| Feed distillation range, ° F.: | | | |
| Start | 391 | 415 | 406 |
| 5% | 493 | 449 | 438 |
| 10% | 534 | 462 | 453 |
| 30% | 602 | 482 | 480 |
| 50% | 643 | 510 | 511 |
| 70% | 676 | 548 | 557 |
| 90% | 720 | 608 | 624 |
| 95% | 736 | 629 | 658 |
| End point | 809 | 727 | 719 |

The following examples will more clearly set forth various features of the present invention.

EXAMPLE 1

A catalyst comprising nickel and tin oxides associated with a porous siliceous oxide was prepared by a preferred coprecipitation procedure of the present invention. A solution was prepared by adding 39 grams of $SnCl_2 \cdot 2H_2O$, 1464 grams of an $AlCl_3$ solution containing 117 grams/liter of aluminum, and 335 grams of an $NiCl_2$ solution containing 181 grams/liter of nickel directly to a vessel containing 4 liters of water and 180 ml. of glacial acetic acid. Thereafter 878 grams of commercial sodium silicate (29.6% $SiO_2$ and 9.2% $Na_2O$) dissolved in 3 liters of water were added and the resulting mixture rapidly stirred to form a clear solution and/or sol. The components were then coprecipitated to a final pH of about 7.5 by slowly adding, accompanied by stirring, a solution composed of 750 ml. of 15M NH₄OH in 2 liters of water. The resulting slurry was then aged for ½ hour at a temperature of 149° F., the pH of the slurry being about 6.5 to 7.5 during the aging period. The slurry was then cooled and filtered to remove excess water and the precipitate recovered. The latter was then sequentially washed four times with a 1 percent aqueous solution of ammonium acetate folowed by one wash with distilled water. All washes were conducted at a temperature of about 150° F. and a pH of about 6.5. The precipitate from the last wash was dried for 15 hours at 150° F. and thereafter calcined by contacting with air at a temperature ranging from 400 to 1000° F. for 6 hours, then contacted with dry air at a temperature of 1350° F. for 3 hours. The resulting composite of metal oxides contained 11.2 weight percent nickel oxide and 4.9 weight percent tin oxide, and 83.9 weight percent silica-alumina, the silica to alumina weight ratio being 1.9.

The coprecipitated composite of metal oxides was subsequently sulfided by insertion into a reactor where it was heated at 520° F. and a pressure of about 1200 p.s.i.g. in flowing hydrogen for a period of about 1 hour. The catalyst was substantially sulfided by passing a mixture of dimethyldisulfide and mixed hexanes (the mixture contained 7.3 volume percent dimethyldisulfide) into the flowing hydrogen. Injection of the sulfiding agent was continued for 1 hour at a temperature of about 540° F. and then discontinued.

The sulfided catalyst was tested for hydrocracking and found to have increased cracking activity and hydrogenation activity as compared to a catalyst comprising nickel without tin.

EXAMPLE 2

A series of catalysts comprising various concentrations of nickel and tin associated with porous silica-alumina were prepared and sulfided by the method set forth in Example 1. For comparison purposes, catalysts comprising only nickel associated with porous silica-alumina were prepared and sulfided generally as described in Example 1. Furthermore, catalysts comprising various other combinations of hydrogenating metal components were prepared by coprecipitation for comparison purposes. The catalysts were tested for hydrocracking under conditions to permit the determination of the activity indices of the catalysts. The activity indices of the catalysts as well as the amount of hydrogenating metal component in the catalysts are tabulated in Table II. The weight percent hydrogenating metal component is based on the total catalyst composition. The silica to alumina weight ratio in all instances was 1.9. Also shown are the feeds (from Table I) which were used to determine the activity indices.

TABLE II

| Catalyst: | Wt. percent Ni | Sn | Metal | Feed | Activity index |
|---|---|---|---|---|---|
| A | 8.8 | 0 | | 2 | 14.1 |
| B | 8.8 | 4.3 | | 2 | 29.0 |
| C | 8.1 | 4.5 | | 2 | 24.3 |
| D | 8.5 | 8.2 | | 2 | 25.0 |
| E | 8.2 | 2.15 | | 2 | 20.0 |
| F | 10.0 | 17.6 | | 1 | 17.5 |
| G | 7.9 | 6.0 | | 1 | 27.0 |
| H | 10.0 | 1.1 | | 2 | 23.3 |
| I | 2.5 | 0 | | 2 | 8.6 |
| J | 2.5 | 1.0 | | 2 | 11.8 |
| K | | 8.8 | 10 (Co) | 2 | Nil |
| L | ~8.8 | | 4 (Zn) | 2 | 12.8 |
| M | ~8.8 | | 4.7 (Pb) | 2 | 5.2 |
| N | 0 | 9.0 | | 2 | Nil |

Catalyst A which comprises 8.8 weight percent nickel associated with silica-alumina but contains no tin has an activity index of 14.1. The addition of small amounts of tin to a catalyst significantly increases the activity index. For example, catalyst B comprising 4.3 weight percent tin and 8.8 weight percent nickel has an activity index of 29. Even the presence of 1 weight percent tin in a catalyst comprising nickel leads to increased activity over a catalyst having no tin. Compare, for example, the activity indices of catalysts I and J. The catalyst comprising tin as the hydrogenating metal component associated with silica-alumina, that is catalyst N, has virtually a zero activity index. The catalysts containing cobalt and tin (catalyst K); nickel and zinc (catalyst L); and nickel and lead (catalyst M) possess very low activity indices.

EXAMPLE 3

Catalysts were prepared whereby the hydrogenating nickel and tin components were impregnated onto a porous siliceous oxide. Thus, for example, a catalyst comprising 8 weight percent nickel and 4 weight percent tin, based on the final catalyst composition, was prepared by impregnating a silica-alumina carrier with a nickel chloride and tin chloride solution. Thereafter, the impregnated catalyst was dried, then steam calcined at 800° F. to remove extraneous materials, e.g., chloride, and thereafter calcined in a dry atmosphere. The catalyst was subjected to sulfiding and subsequently tested for hydrocracking activity. Another impregnated catalyst was prepared by impregnating a crystalline zeolitic aluminosilicate (zeolite Y) with a nickel chloride and tin chloride solution. The impregnated zeolite catalyst was dried, calcined and sulfided by conventional processes, and then tested for hydrocracking.

The impregnated catalysts were found effective for hydrocracking, although they did not perform as well for hydrocracking as the coprecipitated catalyst of Example 1.

EXAMPLE 4

A catalyst comprising nickel impregnated onto a coprecipitated composite of tin and silica-alumina was prepared and tested for hydrocracking of a light cycle oil feed boiling in the range from 409° to 740° F. The coprecipitated composite was prepared generally by the method of Example 1; that is, an acidic aqueous solution of the compounds, stannous chloride, aluminum chloride, and sodium silicate, was precipitated by adding ammonium hydroxide to the solution; the precipitated slurry was then washed, dried, and calcined. The nickel was impregnated onto the coprecipitated composite from a nickel nitrate solution. The catalyst, comprising about 8 weight percent nickel and about 4.5 weight percent tin, was calcined at 1000° F. and at 1300° F. The hydrocracking process was conducted at a temperature of 540° F., an LHSV of 2 and a pressure of 1200 p.s.i.g. The catalyst was found to have higher hydrogenation activity and hydrocracking activity than a catalyst comprising a coprecipitated composite of nickel and silica-alumina but without tin. Furthermore, the catalyst comprising nickel impregnated onto a coprecipitated composite of tin and silica-alumina was superior in hydrocracking activity to a catalyst comprising both nickel and tin impregnated onto silica-alumina. However, a catalyst comprising a coprecipitated composite of nickel and tin and silica-alumina displayed higher hydrocracking activity than a catalyst comprising nickel impregnated onto a coprecipitated composite of tin and silica-alumina.

EXAMPLE 5

A series of catalysts were prepared comprising various concentrations of a crystalline zeolitic aluminosilicate (zeolite Y) thoroughly admixed with amorphous silica-alumina, the composition containing various concentrations of nickel and tin. The catalysts were prepared and sulfided by the procedure generally set forth in Example 1. In the preparation of the catalysts, the zeolite was added to the solution and/or sol of compounds during precipitation. The catalysts were tested for hydrocracking under conditions to permit the determination of the activity indices of the catalysts. The results are tabulated in Table III.

TABLE III

| Catalyst: | Wt. percent | | | Feed | Activity index |
|---|---|---|---|---|---|
| | Ni | Sn | Zeolite | | |
| O | 9.2 | 4.0 | 15 | 3 | 32.2 |
| P | 7.6 | 2.9 | 30 | 3 | 27.0 |
| Q | 9.8 | 8.6 | 30 | 3 | 19.5 |

EXAMPLE 6

A catalyst comprising 11.1 weight percent nickel, 6.8 weight percent tin, 15 weight percent crystalline zeolitic aluminosilicate (zeolite Y) and the remainder amorphous silica-alumina was prepared and sulfided generally by the procedure outlined in Example 1. The catalyst was fluorided by adding a solution of ammonium fluoride during precipitation of the solution and/or sol. The fluoride content was about 2.8 weight percent. The fluorided catalyst was tested for hydrocracking with Feed 1 of Table I and found to have an activity index of 30.6

Hydrocracking catalysts comprising nickel disposed on a porous inorganic oxide support have been found to undergo changes during exposure to hydrocarbon feed under hydrocracking conditions. The changes which occur appear to be related to a crystalline growth phenomena of the hydrogenating nickel component of the catalysts. A growth of nickel crystallites apparently leads to catalyst deactivation and furthermore to difficulty of regeneration. Whereas fluoride is often desired in hydrocracking catalysts comprising nickel because of the additional acidity and selectivity which it imparts to the catalysts, fluoride has the undesirable effect of further increasing nickel crystalline growth which leads to increased deactivation of the catalysts. It has been found that the presence of fluoride in a catalyst comprising nickel and tin, or compounds thereof, associated with a porous inorganic oxide does not contribute to the growth of nickel crystallites to any significant extent. Thus, the addition of tin to a catalyst comprising nickel and having minor amounts of fluoride present is considered to have resolved one of the serious problems with fluorided catalysts.

In addition, catalysts comprising nickel and crystalline zeolitic aluminosilicates without tin show increased nickel crystallite growth during hydrocracking. The crystallite growth occurs regardless of the absence of fluoride. This phenomenon has in the past led to the use of other more stable hydrogenating metal components, such as palladium, in zeolite combinations. The catalysts comprising nickel and tin, or compounds thereof, and crystalline zeolitic aluminosilicates do not show growth of nickel crystallites with hydrocracking use.

EXAMPLE 7

Several catalysts comprising various concentrations of nickel and/or tin associated with a silica-alumina support, and identified in Example 2, were tested for hydrocracking with Feed 2 of Table I, under conditions permitting the determination of activity indices. From the measured conversion of the feed to lower boiling products at 570° F. and 540° F., the temperature required for 60 percent conversion was determined; the aniline point at 60 percent conversion was also determined. The results are presented in Table IV.

TABLE IV

| Catalyst: | Wt. percent | | 60% conversion | |
|---|---|---|---|---|
| | Ni | Sn | Temp., °F | Aniline pt. |
| A | 8.8 | 0 | 578 | 122.2 |
| C | 8.1 | 4.5 | 560 | 128.2 |
| E | 8.2 | 2.15 | 567 | 124.8 |
| N | 0 | 9 | 560+ | 110.5 |

The addition of tin to a catalyst comprising nickel associated with a porous siliceous oxide measurably increases the activity of the catalyst as can be seen from the decrease in the temperature required to obtain 60 percent conversion of the feed to lower boiling products (catalysts C and E) as compared to a catalyst comprising nickel but no tin (catalyst A). Furthermore, the hydrogenation activity of the catalysts comprising nickel and tin are significantly increased over the hydrogenation activity of the catalyst comprising nickel without tin as seen from the increase in aniline points of catalysts C and E over that of catalyst A. An increase in the aniline point is a measure of the increase in the hydrogenation activity of the catalyst.

EXAMPLE 8

The hydrocracking activity over prolonged periods of time of a catalyst comprising a crystalline zeolitic aluminosilicate thoroughly admixed with an amorphous silica-alumina, and containing catalytically active amounts of nickel and tin (catalyst Q in Table III, Example 5), was compared with the hydrocracking activity of a catalyst comprising nickel associated with a silica-alumina support but containing no tin (catalyst A, Table II, Example 2). The catalysts were prepared and sulfided generally by the method set forth in Example 1. Catalyst Q contained 30 weight percent crystalline zeollitic aluminosilicate, 9.8 weight percent nickel and 8.6 weight percent tin, the remainder being silica-alumina. Catalyst A contained about 8.8 weight percent nickel associated with a silica-alumina carrier. The catalysts were separately contacted with an identical feedstock and hydrogen in a hydrocracking reactor at the same conditions except for temperature. The feed was a hydrofined light catalytic cracking unit cycle oil, identified as Feed 3 of Table I. The reaction conditions included a pressure of 1200 p.s.i.g. and a hydrogen gas rate of 5,600 s.c.f./bbl. feed. The reaction temperature was adjusted in order to maintain throughout the run an 80 percent conversion of the feed to products boiling below the initial boiling point of the feed. The adjustments necessary to be made upon the reaction temperatures give rise to the fouling rate determinations. Thus, as the catalyst becomes deactivated, higher reaction temperatures are necessary in order to maintain the required 80 percent conversion of the feed. The more rapid the rate of temperature increase, the more rapid the rate of undesirable catalyst fouling. Fouling rate can be expressed in terms of temperature and time. Catalyst Q had a fouling rate of about .045° F. per hour which means that the reaction temperature had to be increased about 4.5° F. at 100-hour intervals in order to maintain the 80 percent conversion. Curves 1 and 2 in the figure show the comparison of catalysts Q and A with respect to the average catalyst temperatures within the hydrocracking reactor required to maintain an 80 percent conversion as a function of hours onstream of the catalysts. From the figure, it can be seen that the reaction temperature necessary to maintain the desired conversion rose very rapidly for a catalyst comprising nickel but no tin (curve 2) in comparison with that necessary for a catalyst of the present invention (curve 1).

The following example shows the usefulness of the novel catalyst for the production of high quality jet fuels. Jet fuel fractions generally boil in the range from 300° F. to 530° F., and preferably 320° F. to 500° F.

EXAMPLE 9

A nickel-tin supported catalyst comprising a coprecipitated composite of nickel, tin, and silica-alumina was used for hydrocracking a hydrocarbon feed to produce a high quality jet fuel fraction. The catalyst contained about 9.1 weight percent nickel and about 3.9 weight percent tin. For comparison purposes, a nickel supported catalyst comprising a coprecipitated composite of nickel and silica-alumina but without tin was used for hydrocracking a similar hydrocarbon feed. The nickel supported catalyst contained about 9.5 weight percent nickel. The feeds used with both catalysts were straight run gas oils boiling within a range from about 500° F. to about 1000° F. The feeds were considered equivalent for test purposes. The reaction conditions included a temperature of 680° F., a pressuse of 1900 p.s.i.g., and a liquid hourly space velocity of 1.5.

The nickel-tin supported catalyst produced a 320° F. to 500° F. fraction of improved jet fuel quality as measured by the smoke point. The jet fuel smoke point was 24 mm. as compared to a jet fuel smoke point of 20 mm. for the 320° F.–500° F. jet fuel fraction recovered from the process using the nickel supported catalyst.

The following example illustrates the advantage of the catalyst of the present invention for the conversion of aromatic hydrocarbons into more saturated hydrocarbons.

EXAMPLE 10

Two catalysts were prepared generally according to the method of Example 1 and are identified as catalysts A and C in Table II, Example 2. Catalyst A, comprising a coprecipitated composite of nickel and silica-alumina, and catalyst C, comprising a coprecipitated composite of nickel, tin, and silica-alumina, were tested for the hydrogenation of a sulfur-free benzene feed at a temperature of 725° F., a pressure of 1200 p.s.i.a., a liquid hourly space velocity of 3, and a hydrogen to benzene ratio of 10. The catalyst comprising nickel and tin (catalyst C) was far superior in the hydrogenation of benzene than the catalyst comprising nickel without tin (catalyst A). For example, after approximately 20 hours of operation, the process using catalyst C resulted in 98.4 mole percent benzene converted to methylcyclopentane and cyclohexane with only 1.4 mole percent benzene converted to cracked products. On the other hand, the process using catalyst A resulted in only 83.7 mole percent benzene converted to methylcyclopentane and cyclohexane but with 16.2 mole percent benzene converted to cracked products. Thus, the catalyst of the present invention when used for benzene hydrogenation displays high hydrogenation activity and low cracking activity as compared to a catalyst comprising a coprecipitated composite of nickel and silica-alumina but without tin.

Catalysts A and C were also tested for the hydrogenation of a benzene feed containing about 20 p.p.m. sulfur under the same reaction conditions as were used in the tests with the sulfur-free benzene feed. The catalyst comprising nickel and tin (catalyst C) produced a higher concentration of converted products (methylcyclopentane and cyclohexane) over a significantly longer period of time than the catalyst comprising nickel but containing no tin (catalyst A). The sulfur markedly decreased the benzene hydrogenation activity of catalyst A after only about 5 hours onstream time. The benzene hydrogenation activity of catalyst C decreased as a result of the presence of sulfur only after 15 to 20 hours onstream time.

The foregoing disclosure of this invention is not considered to be limiting since variations can be made by those skilled in the art without departing from the scope and spirit of the appended claims.

I claim:

1. A catalyst comprising nickel, or compounds thereof selected from the group consisting of nickel tin, nickel oxide and nickel sulfide, in association with a coprecipitated composite of tin, or compounds thereof selected from the group consisting of tin oxide and tin sulfide, and a siliceous oxide; said nickel or said compounds thereof, and tin, or said compounds thereof, being present in an amount from 2–50 combined weight percent metals with a nickel to tin weight ratio of from 0.25–20.

2. The catalyst of claim 1 wherein said nickel, or compounds thereof, and tin, or compounds thereof, are present in an amount from 5–30 combined weight percent metals, with a nickel to tin ratio of from 0.25–20.

3. The catalyst of claim 1 wherein said siliceous oxide is silica-alumina.

4. The catalyst of claim 3 wherein said silica is present in an amount of at least 30 weight percent.

5. The catalyst of claim 1 wherein a crystalline zeolitic aluminosilicate is thoroughly admixed with said coprecipitated composite.

6. The catalyst of claim 5 wherein said crystalline zeolitic aluminosilicate is of the Y crystal type.

7. The catalyst of claim 1 wherein halide is present in an amount of 0.1 to 5 weight percent.

8. The catalyst of claim 7 wherein said halide is fluoride.

9. A catalytic composition of matter which comprises a coprecipitated composite of nickel, or compounds of nickel selected from the group consisting of nickel tin, nickel oxide and nickel sulfide, tin or compounds of tin selected from the group consisting of tin oxide and tin sulfide, and a siliceous oxide; said nickel and tin being present in an amount from 2–50 combined weight percent metals, with a nickel to tin weight ratio of from 0.25–20.

10. A catalyst comprising a coprecipitated composite of nickel and tin, or their oxides or sulfides, and silica-alumina, said nickel and tin being present in an amount from 2–50 combined weight percent metals, with a nickel to tin weight ratio of from 0.25–20, and said silica-alumina comprising from 30–99 weight percent silica and from 1–70 weight percent alumina.

References Cited

UNITED STATES PATENTS

| | | | |
|---|---|---|---|
| 2,911,356 | 11/1959 | Hanson | 208—110 |
| 3,140,253 | 7/1964 | Plank et al. | 252—455 X |
| 3,401,125 | 9/1968 | Jaffe | 252—453 X |

DANIEL E. WYMAN, Primary Examiner

C. F. DEES, Assistant Examiner

U.S. Cl. X.R.

252—442, 453, 454, 455, 459

PO-1050
(5/69)

UNITED STATES PATENT OFFICE
CERTIFICATE OF CORRECTION

Patent No. __3,542,696__     Dated __November 24, 1970__

Inventor(s) __BERNARD F. MULASKEY__

It is certified that error appears in the above-identified patent and that said Letters Patent are hereby corrected as shown below:

Col. 6, line 5, "compounds" should read --component

Col. 11, line 74, "560+" should read --750+--.

SIGNED AND SEALED
MAR 9 1971

(SEAL)
Attest:

Edward M. Fletcher, Jr.
Attesting Officer

WILLIAM E. SCHUYLER,
Commissioner of Patents